US008085442B2

(12) United States Patent
De Waal

(10) Patent No.: US 8,085,442 B2
(45) Date of Patent: Dec. 27, 2011

(54) METHOD OF PRODUCING A TILED PRINT PRODUCT

(75) Inventor: Cornelis A. De Waal, Nijmegen (NL)

(73) Assignee: OCE-Technologies B.V., Venlo (NL)

( * ) Notice: Subject to any disclaimer, the term of this patent is extended or adjusted under 35 U.S.C. 154(b) by 1130 days.

(21) Appl. No.: 11/878,404

(22) Filed: Jul. 24, 2007

(65) Prior Publication Data

US 2008/0019753 A1 Jan. 24, 2008

(30) Foreign Application Priority Data

Jul. 24, 2006 (EP) .................................... 06117719

(51) Int. Cl.
*H04N 1/407* (2006.01)
*H04N 1/409* (2006.01)
*G06K 15/00* (2006.01)
*G06K 15/02* (2006.01)
*B41M 1/14* (2006.01)

(52) U.S. Cl. ...... 358/3.26; 358/1.9; 358/3.27; 358/1.12; 358/1.18; 358/501; 382/268; 382/275; 347/174; 430/45.5; 430/45.53; 400/76

(58) Field of Classification Search ................. 430/45.5, 430/45.53; 358/1.9, 3.26, 3.27, 1.12, 1.18, 358/501; 382/268, 275
See application file for complete search history.

(56) References Cited

U.S. PATENT DOCUMENTS 6,061,544 A * 5/2000 Aslam .......................... 399/330
6,101,345 A * 8/2000 Van Goethem et al. ........ 399/69
6,354,692 B1 * 3/2002 Ross .............................. 347/41
6,494,570 B1 * 12/2002 Snyder .......................... 347/103
6,551,678 B1 * 4/2003 O'Brien et al. ................. 428/44
6,597,428 B1 * 7/2003 Adachi et al. ................... 355/40
6,669,319 B2 * 12/2003 Shimizu .......................... 347/15
7,147,296 B2 * 12/2006 Kakutani ........................ 347/15
7,152,950 B2 * 12/2006 Takekoshi et al. .............. 347/43
7,161,711 B2 * 1/2007 Mori et al. ..................... 358/1.9
7,542,163 B2 * 6/2009 Kato .............................. 358/1.2
7,611,219 B2 * 11/2009 Kakutani ........................ 347/15
7,682,013 B2 * 3/2010 Hoshino ........................ 347/102
2002/0175942 A1 * 11/2002 Seitz, Jr. ....................... 345/764
2002/0197586 A1 * 12/2002 Worth ............................ 434/75
2003/0090555 A1 * 5/2003 Tatsumi ........................ 347/101
2003/0107774 A1 * 6/2003 Scott ............................ 358/302
2003/0156148 A1 * 8/2003 King et al. ...................... 347/19
2003/0228167 A1 * 12/2003 Hasegawa et al. .............. 399/69
2004/0004731 A1 * 1/2004 Itagaki .......................... 358/1.9
2004/0169710 A1 * 9/2004 Ide et al. ........................ 347/101
2005/0128234 A1 * 6/2005 Yokozawa ...................... 347/12
(Continued)

FOREIGN PATENT DOCUMENTS

EP 1 555 131 A2 7/2005
(Continued)

*Primary Examiner* — King Poon
*Assistant Examiner* — Beniyam Menberu
(74) *Attorney, Agent, or Firm* — Birch, Stewart, Kolasch & Birch, LLP

(57) ABSTRACT

In a method of producing a tiled print product, the print product is composed of a plurality of print substrates that are printed separately and are disposed adjacent to one another in at least one row. Each substrate is printed by means of a print process that creates a gloss gradient in a characteristic direction of production that is parallel to the row. The characteristic direction of production is inverted for every second substrate in the row.

6 Claims, 2 Drawing Sheets

U.S. PATENT DOCUMENTS

2005/0156965 A1 7/2005 Hoshino
2005/0212882 A1* 9/2005 Naniwa ..................... 347/102
2005/0219641 A1* 10/2005 Kitano et al. ............. 358/448
2006/0115287 A1* 6/2006 Roof ......................... 399/67
2006/0146078 A1 7/2006 Reinten
2006/0146084 A1* 7/2006 Reinten ..................... 347/15
2006/0161267 A1* 7/2006 Clausen ..................... 623/55
2006/0198660 A1* 9/2006 Bessho ..................... 399/223
2006/0221404 A1* 10/2006 Sato ......................... 358/3.26
2006/0227194 A1* 10/2006 Hoshino ................... 347/102
2006/0251433 A1* 11/2006 Funabiki ................... 399/45
2006/0275578 A1* 12/2006 Jones ........................ 428/85
2006/0290760 A1* 12/2006 German et al. ............ 347/102
2008/0284804 A1* 11/2008 Seccombe .................. 347/9

FOREIGN PATENT DOCUMENTS

EP 1 676 710 A1 12/2005
JP 05-338265 * 12/1993
JP 2005-217942 * 8/2005

* cited by examiner

METHOD OF PRODUCING A TILED PRINT PRODUCT

CROSS-REFERENCE TO RELATED APPLICATIONS

This nonprovisional application claims priority under 35 U.S.C. §119(a) on Patent Application No. 06117719.2, filed in the European Patent Office on Jul. 24, 2006, the entirety of which is incorporated herein by reference.

BACKGROUND OF THE INVENTION

1. Field of the Invention

The present invention relates to a method of producing a tiled print product, wherein the print product is composed of a plurality of print substrates that are printed separately and are disposed adjacent to one another in at least one row. Each substrate is printed by means of a print process that creates a gloss gradient in a characteristic direction of production that is parallel to the row.

2. Description of Background Art

When a large format print product such as a billboard or the like has to be prepared, which has a width larger than the printing width of an available printer, then it is common practice to decompose the image on the print product into a number of sub-images that are printed on separate sheets. The sheets are then put together like tiles in one or more rows, so that the print product, as a whole, will show the complete image.

Depending on the print process that is used for separately printing the individual substrates or tiles, the printed images on the individual substrates may have a gloss gradient in the direction of the rows of the tiled print product. That is, the gloss of the printed image on an individual tile slightly decreases or increases in the direction in which the tiles are juxtaposed in a row. This gloss gradient is determined by a direction of production that is characteristic for the print process employed for printing the individual substrate.

For example, when the print process is a multi-pass ink jet process, wherein a printhead is scanned across the substrate in a main scanning direction that will later form the row direction of the tiled product, the characteristic direction of production will be the direction in which the printhead moves across the substrate in the first scan pass in the process of printing an individual image swath. In the second scan pass, the printhead will then move across the same swath in the opposite direction. As a consequence, at the start end of the swath, the timings at which image dots are formed in the first and second passes, respectively, are separated by a relatively large time interval, corresponding to the time that the printhead needs to move back and forth across the substrate. In contrast, at the opposite end of the swath, the image dots in the second pass will be formed immediately on the dots that have been printed in the first pass, and the interval between the two timings will be very small. These different time intervals gives rise to a slight change in the image gloss.

If one considers only the image printed on a single substrate, then the slight gradient in the image gloss is normally not perceptible to the human eye and is therefore not considered to degrade the image quality. However, when several substrates that have been printed in this way are put together, a discontinuous change in the gloss will occur at the transitions between the adjacent substrates. These discontinuous changes may be visible and may disturb the appearance of the print product as a whole.

SUMMARY OF THE INVENTION

It is therefore an object of an embodiment of the present invention to provide a method of producing such a tiled print product with an improved image quality, in spite of the gloss gradient that is caused by the print process.

According to an embodiment of the present invention, this object is achieved by inverting the characteristic direction of production for every second substrate in the row.

Thus, if in the print process that is adopted for printing the first, third and any further uneven substrates in a row, the characteristic direction of production is from left to right, for example. Consequently, the gloss will increase from left to right. The print process used for printing the second, fourth and any further even substrate in the row will then be modified such that the characteristic direction of production is from right to left. As a result, when going along the row of substrates, the gloss will alternatingly rise and fall, with continuous transitions at the borders between adjacent substrates. Thus, discontinuities in the gloss that would be perceptible to the human eye are eliminated, and the image quality will be improved.

One method of inverting the characteristic direction of production comprises the steps of subjecting the image information that is to be printed on every second substrate to an image processing that rotates the image by an angle of 180°, printing all substrates with the same print process, so that a rotated image is printed onto every second substrate, and then physically rotating every second substrate before the substrates are put together to form the tiled print product.

In this method, which is applicable to any print process giving rise to a gloss gradient, the characteristic direction of production for every second substrate is inverted relative to the orientation of the image on the substrate rather than relative to the printer hardware. Yet, when the tiles are put together, the result is that a high-gloss edge of each substrate will be adjacent to a high-gloss edge of the neighboring substrate, and each low-gloss edge will be adjacent to a low-gloss edge, so that no gloss discontinuities will appear on the print product.

When the print product comprises two or more rows of substrates or tiles, the method will be employed in the same way for forming each row, with the result that the adjacent high-gloss edges in one row will coincide with adjacent high-gloss edges in the other rows, so that there will also be no gloss discontinuities at the row-to-row transitions.

If a print process such as a color ink jet process is employed, a plurality of printheads, e.g. for different colors, are arranged side-by-side in the main scanning direction and are commonly moved across the substrate. It is a known and frequently preferred practice to arrange the printheads in a mirror-symmetrical configuration, so that printheads of each type (e.g. each color) are present in duplicate and are arranged to be mirror images of one another (possibly with the exception of a single central printhead which will be the mirror image of itself). This has the advantage that the sequence in which the ink dots from the various printheads are deposited on the substrate can always be the same, regardless of the direction in which the carriage is moved. In color printing, such a process is frequently employed in order to suppress the phenomenon of so-called color banding. When such a symmetric printhead configuration is used, the characteristic direction of production may be the direction in which the carriage moves in the first scan pass (for example from the upper left-hand corner to the upper right-hand corner). This direction can be inverted by causing the carriage to start with the scan movement from the opposite side of the substrate (in this case from the upper right-hand corner to the upper left-hand corner). In this case, the direction of production will be inverted relative to the printer hardware for every second image, and it is not necessary to rotate the images to be printed on the even and uneven substrates.

In an embodiment of this print process using the mirror symmetrical printhead configuration, a first set of printheads can be used for a first scan pass, when the carriage on which the printheads are mounted moves in a first direction. A second set of printheads, which is the mirror image of the first set, can be used for the second pass, when the carriage moves in the opposite direction. This method has the advantage that the digital processing of the image before printing itself is relatively simple since only one print head per color will be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
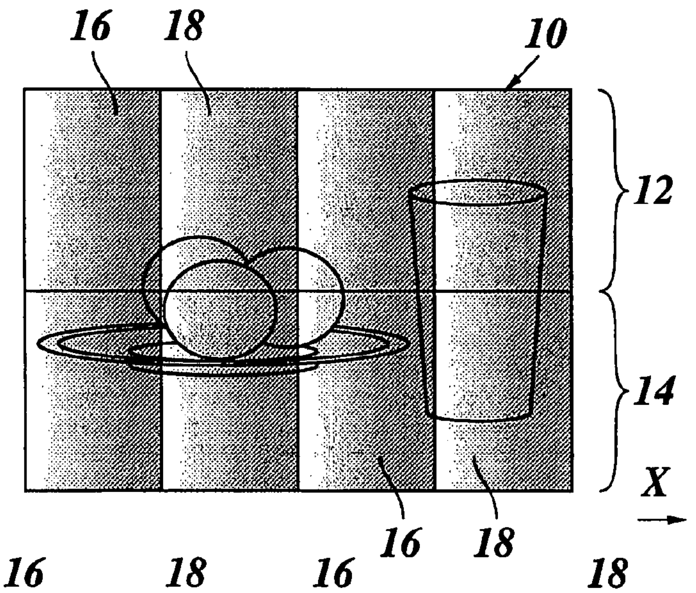
Fig. 1 (Prior Art)
FIG. 1 is a schematic view of a tiled print product obtained by a method according to the background art.

FIG. 1 shows a tiled print product 10, e.g. a billboard, that is composed of two rows 12, 14 of print substrates 16, 18 and has been produced by a method according to the background art, wherein each substrate 16, 18 has been printed separately on an ink jet printer.

In the example shown, each row 12, 14 includes four substrates. The first and third substrate in each row, i.e. the uneven substrates, have been designated by reference numeral 16, whereas the second and fourth (even) substrates have been designated by reference numeral 18.

An arrow X, which is parallel to the direction of the rows 12, 14, designates a characteristic direction of production for the ink jet print process employed for printing each of the substrates 16, 18. For reasons that will be explained below, this characteristic direction of production gives rise to a gradient in the gloss of the images on the individual substrates 16, 18. This gloss gradient has been symbolized here by a gradient in shading. In each of the substrates 16, 18, the gloss (shading) gradually increases in the direction X, but then changes abruptly at each transition from one substrate to the next one in the same row. Each substrate 16, 18 bears a part of the total image to be shown on the billboard, and these part images are perfectly stitched or tiled together. However, the discontinuities at the transitions between the substrates 16, 18 will be perceptible and will degrade the image quality of the print product 10.

Figure 2:
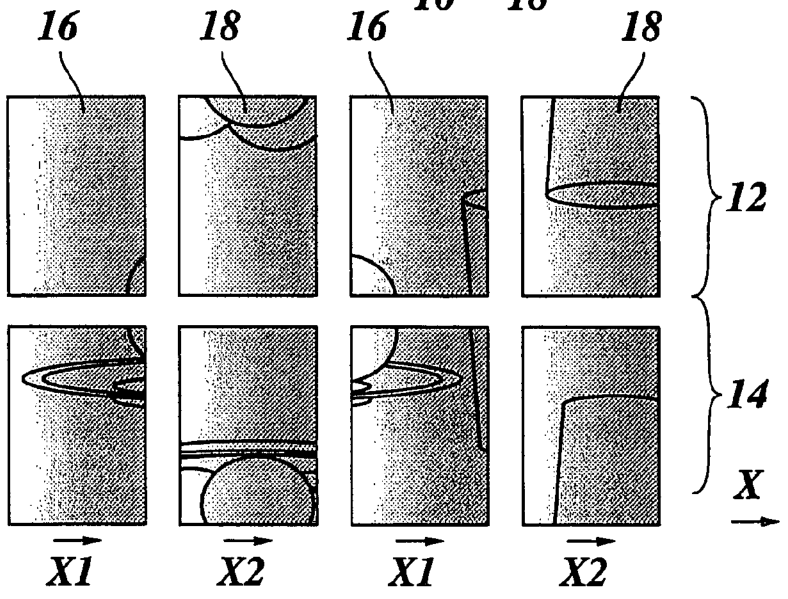
FIG. 2 is a schematic view of individual substrates of a print product as obtained by the method according to the present invention.
Figure 3:
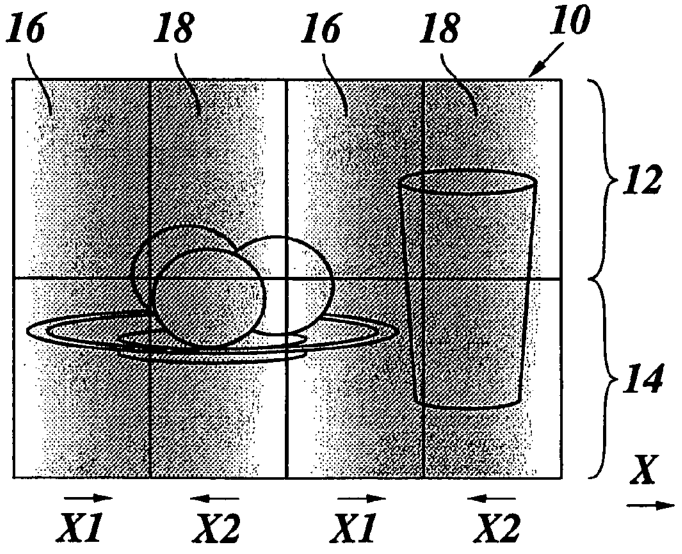
FIG. 3 is a schematic view of a print product obtained by tiling the substrates shown in FIG. 2, with every second substrate in each row being rotated.

FIGS. 2 and 3 illustrate a method according to the present invention, by which this degradation in image quality can be avoided.

FIG. 2 shows an "exploded" view of the print product 10, which bears the same image as in FIG. 1, but with the substrates 16, 18 now being printed in accordance with the present invention. Each substrate has been shown in the orientation in which it has left the printer. As will be seen, the part images on the uneven substrates 16 are the same as in FIG. 1. However, the images on the even substrates 18 show the same motives as in FIG. 1, but are rotated by an angle of 180°, so that they appear upside down. It should be noted that, in this context, "rotated" does not refer to a physical rotation of the substrate sheets, but rather to a rotation of the images printed on the substrates. This rotation has been achieved by appropriate image processing techniques applied to the print data before they have been supplied to the printer, as is well known in the art. Thus, in the orientation shown in FIG. 2, the gloss gradient of all even and uneven substrates 16, 18 is the same as in FIG. 1. The corresponding characteristic directions of production have been designated as X1 for the uneven substrates 16 and as X2 for the even substrates 18.

Now, in order to obtain the desired image on the overall billboard, the even substrates 18 in FIG. 2 have to be rotated physically, i.e. the sheets have to be rotated, before the substrates are put together in the manner shown in FIG. 3. A combined effect of the rotation of the image data prior to printing and the physical rotation of the sheets 18 after printing is that the characteristic directions of production, X2, are inverted in comparison to the characteristic directions of production, X1, of the uneven substrates 16. As a consequence, the gloss now gradually increases from left to right on the first substrates 16 in each row, reaches a maximum at the transition between the first substrates 16 and the second substrates 18 and then gradually decreases again towards the transition from the second substrates 18 to the third substrates 16, and so on. Thus, the gloss is now a continuous function of the position in the direction indicated by the arrow X, and gloss discontinuities are removed, so that the gloss differences will be practically invisible.

Figure 4:
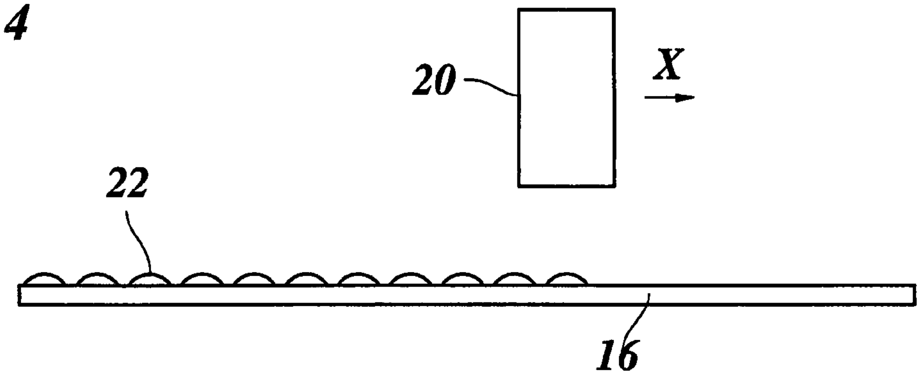
FIG. 4 is a sketch illustrating a first print pass in an ink jet print process.
Figure 5:
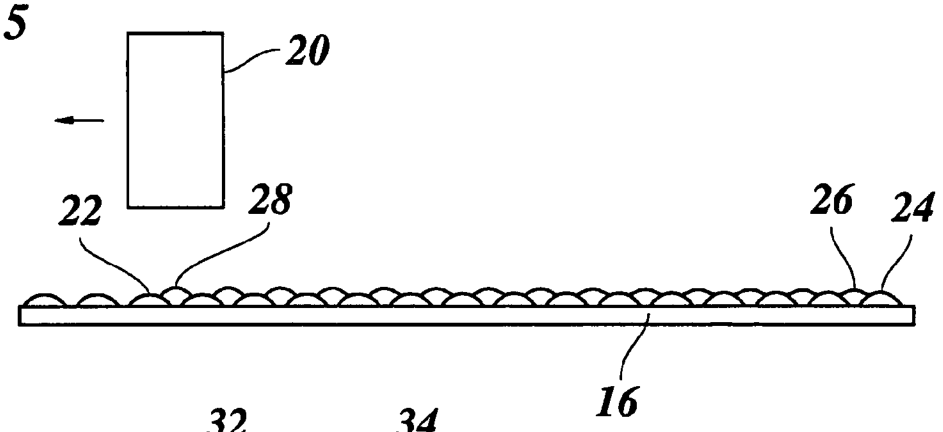
FIG. 5 is sketch illustrating a second scan pass in the process shown in FIG. 4.

FIGS. 4 and 5 schematically illustrate a well known two-pass ink jet print process that may be employed for printing the substrates 16, 18 shown in FIG. 2. In a first pass, shown in FIG. 4, a printhead 20 is moved across the substrate 16 (or 18) in the direction of arrow X, and ink droplets are expelled from nozzles (not shown) of the printhead 20, so as to form a regular pattern of ink dots 22 on the ink substrate 16. In practice, the printhead 20 will have a plurality of nozzles aligned in the direction normal to the plane of the drawing in FIG. 4, so that ink dots 22 are simultaneously formed in a large number of parallel lines forming a swath of the image to be printed.

In FIG. 5, the printhead 20 has completed its stroke or pass in the positive X-direction and now travels across the substrate 16 in an opposite direction to perform a second pass. An ink dot 24 is the last one that has been formed in the first pass, and then the timings at which the nozzles are fired have been controlled such that, during the second pass, ink dots 26, 28 are formed to fill the gaps between the dots 22, 24 of the first pass. The ink dot 26 has been formed shortly after the ink dot 24, so that the ink dot 24 had practically no time to dry-out. As a consequence, the inks of the dots 24 and 26 have merged to give a relatively smooth ink surface having a relatively high gloss. On the other hand, when the dot 28 is formed, the ink of the dot 22 has dried already to a considerable extent, so that the ink surface formed in this part of the substrate 16 will be rougher and will have a somewhat lesser gloss. Although the gloss difference from dot to dot will be practically imperceptible, the gloss difference between the left and right edges of the substrate in FIG. 5 may be significant, especially in a case when the printer is a large format printer and the substrate 16 (or 18) has a large width, for example in the order of 1 m. However, due to the inversion of the characteristic direction of production, as was explained in conjunction with FIGS. 2 and 3, even these large gloss differences will not give rise to any perceptible discontinuities in the gloss.

Figure 6:
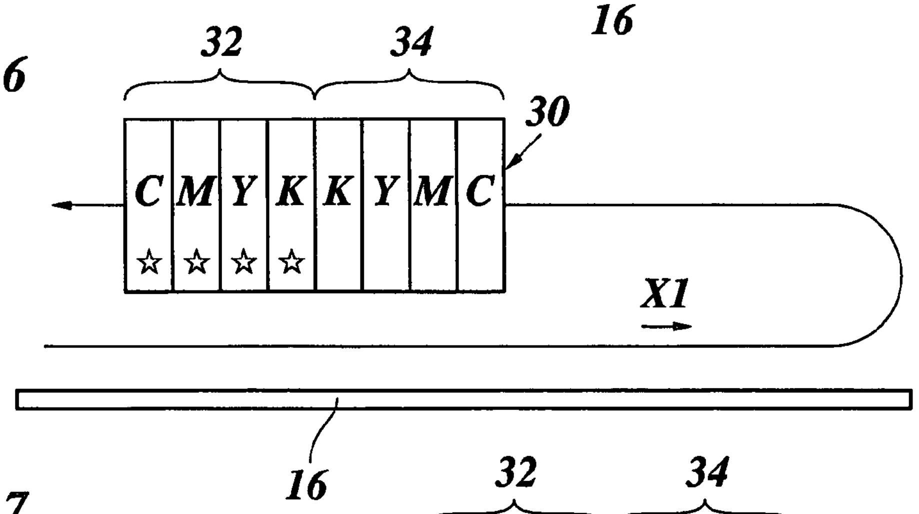
FIG. 6 is a sketch illustrating a second print pass in a color ink jet print process, as used for every uneven substrate of a tiled print product.

A second embodiment of the method according to the invention will now be described in conjunction with FIGS. 6 and 7. FIG. 6 schematically illustrates a well known two-pass color ink jet print process employing an array 30 of eight printheads that are designated by the letters C, M, Y and K. These letters designate the cyan, magenta, yellow and black (K) colors of the inks of the respective printheads. As shown, the printheads are arranged mirror-symmetrically, so that a first set 32 of printheads CMYK forms the mirror image of a second set 34 of printheads KYMC, and vice versa. In a modified embodiment, the array 30 might comprise only seven printheads with only a single black printhead (K) in the center. In practice, the printheads forming the array 30 will be mounted on a common carriage (not shown) that travels across the substrate 16.

In FIG. 6, the printheads have completed a first pass in which the carriage has travelled in the direction X1, which forms the characteristic direction of production. During this pass, only the printheads of the set 34 have been active, so that ink dots of different colors were deposited on the substrate 16 in the order C-M-Y-K. Now, in FIG. 6, the printheads perform the second pass in the direction opposite to X1, and now only the printheads of the set 32 are active. This has been symbolized by asterisks in the corresponding printheads. It will be appreciated that the order in which the inks of different colors are deposited is the same in both passes. When the second pass has been completed, the substrate 16 will be advanced by the width of the printed swath in a sub-scanning direction normal to the plane of the drawing, and then the first pass for the next swath will commence.

Figure 7:
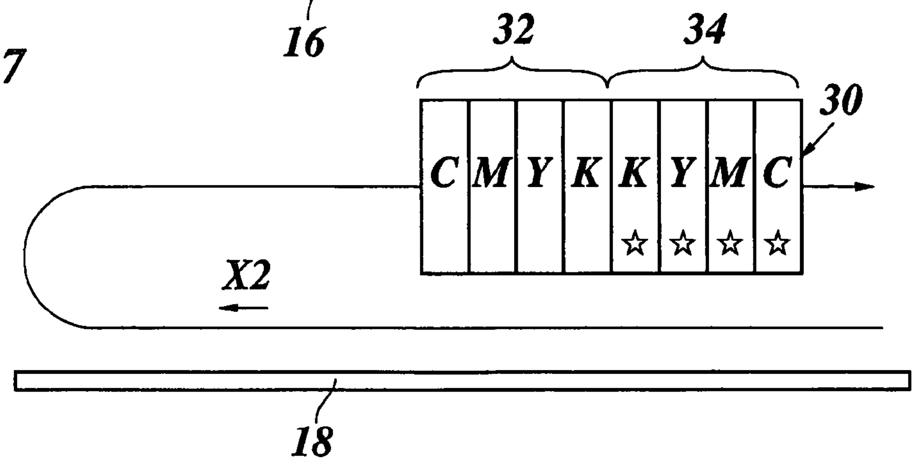
FIG. 7 is a sketch illustrating a second print pass of a color ink jet print process, as applied to every uneven substrate of a tiled print product.

FIG. 7 illustrates the same situation as FIG. 6, but now for the case that an even substrate 18 is printed. In this case, the characteristic direction of production, X2, has been inverted, i.e. the direction in which the array 30 has travelled in the first pass is opposite to that shown in FIG. 6. FIG. 7 shows the array during the second pass, when it travels from left to right. The active printheads have again been designated by asterisks, and these printheads are now those of the set 34.

In this embodiment, the characteristic direction of production is inverted by inverting the directions in which the array 30 travels across the substrate in the first and second passes. Thus, in this embodiment, the substrates 16, 18 forming the print product 10 may be put together in the manner shown in FIG. 3 in the same orientation in which they have left the printer, i.e. it is not necessary to perform image processing for rotating the print data, and it is not necessary to physically rotate the even substrates before the substrates 16, 18 are put together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of printing a tiled print product, wherein the tiled print product is composed of a plurality of print substrates that are disposed adjacent to one another in at least one row including even print substrates and uneven print substrates, and each of the plurality of print substrates is printed separately using a printer that creates a gloss gradient in a printed image in a characteristic direction of production of the printer, and wherein the at least one row is parallel to the characteristic direction of production of the printer, said method comprising the step of:

a) selecting image information for the even print substrates in the at least one row of the plurality of print substrates of the tiled print product;

b) inverting the characteristic direction of production of the images for the even print substrates in the at least one row of the tiled print product with respect to the characteristic direction of production of the images for the uneven print substrates in the at least one row of the tiled product to remove gloss discontinuities on the printed images of the tiled print product caused by the printer, wherein all images for the uneven print substrates have the same characteristic direction of production; and c) printing the images for the even print substrates in the characteristic direction according to the step b).

2. The method of claim 1, wherein the step b) comprises the steps of:

subjecting the image information that is supplied to the printer to image processing resulting in a rotation of the image to be printed by an angle of 180°; and printing all of the plurality of print substrates forming the tiled print product by means of the same print process.

3. The method of claim 2, wherein the tiled print product comprises a plurality of rows, said method further comprising the step of employing the same method for forming each of the rows, so that the printed tiled print product includes continuous gloss transitions at borders between adjacent print substrates.

4. The method of claim 1, wherein all of the substrates forming the tiled print product are printed with the printer, the printer having an array of printheads of different types that are arranged mirror-symmetrically, said method further comprising the steps of:

operating the printer in a multi-pass print mode; and defining the characteristic direction of production as the direction in which the array of printheads is moved in the first pass.

5. The method according to claim 4, further comprising the steps of:

activating printheads of a first set only in passes having a first direction; and activating printheads of a second set, which is the mirror image of the first set, only in passes having a second direction, wherein the characteristic direction of production is the direction in which the array of printheads is moved in the first pass, the first pass being in the first direction or the second direction.

6. The method of claim 1, wherein the step b) comprises the steps of:

inverting the characteristic direction of production through a printer hardware of the printer; and printing all of the plurality of print substrates forming the tiled print product by means of the same print process.

* * * * *